(12) United States Patent
Ward (10) Patent No.: US 11,460,048 B2
(45) Date of Patent: Oct. 4, 2022

(54) ATTACHABLE ACOUSTIC PANELS AND METHOD OF MAKING SAME

(71) Applicant: Rohr, Inc., Chula Vista, CA (US)

(72) Inventor: Stephen H. Ward, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/126,783

(22) Filed: Dec. 18, 2020

(65) Prior Publication Data

US 2022/0194607 A1 Jun. 23, 2022

(51) Int. Cl.
*F04D 29/66* (2006.01)
*B64D 33/02* (2006.01)
*B64D 29/00* (2006.01)
*F02C 7/045* (2006.01)

(52) U.S. Cl.
CPC .......... *F04D 29/663* (2013.01); *B64D 29/00* (2013.01); *B64D 33/02* (2013.01); *F02C 7/045* (2013.01); *B64D 2033/0206* (2013.01)

(58) Field of Classification Search
CPC ....... F04D 29/663; F02D 7/045; B64D 29/00; B64D 2033/0206
See application file for complete search history.

(56) References Cited

U.S. PATENT DOCUMENTS

| 4,858,721 | A | 8/1989 | Autie |
| 6,206,136 | B1 * | 3/2001 | Swindlehurst ....... G10K 11/172 181/290 |
| 6,619,913 | B2 * | 9/2003 | Czachor ................. F01D 21/045 415/173.1 |
| 6,971,841 | B2 * | 12/2005 | Care ...................... F04D 29/526 415/174.4 |
| 7,503,425 | B2 * | 3/2009 | Strunk .................... B64D 33/02 181/213 |
| 7,967,108 | B2 * | 6/2011 | Harper ..................... F02C 7/045 181/290 |

(Continued)

FOREIGN PATENT DOCUMENTS

| CN | 105366060 B | 3/2017 |
| FR | 3059044 B1 | 9/2020 |

(Continued)

OTHER PUBLICATIONS

EP search report for EP21215304.3 dated May 3, 2022.

*Primary Examiner* — Michael L Sehn
(74) *Attorney, Agent, or Firm* — Getz Balich LLC (57) ABSTRACT

A propulsion assembly includes a fan and a fan case system disposed about the fan. The fan case system includes at least one perforated portion including a plurality of holes. The propulsion assembly further includes at least one acoustic panel mounted to the exterior surface of the fan case system coincident with the at least one perforated portion. The at least one acoustic panel includes a core including a plurality of cells extending between a first side of the core and a second side of the core. The at least one acoustic panel further includes a back skin attached to the second side of the core. The first side of the core is in contact with the exterior surface of the fan case system to form a plurality of resonant cavities defined by the plurality of holes, the plurality of cells, and the back skin.

20 Claims, 9 Drawing Sheets

(56) References Cited

U.S. PATENT DOCUMENTS

| | | | |
|---|---|---|---|
| 8,757,958 B2* | 6/2014 | Lussier | ............ F01D 21/045 |
| | | | 415/197 |
| 2003/0156940 A1 | 8/2003 | Czachor | |
| 2011/0139927 A1 | 6/2011 | Porte | |
| 2020/0276641 A1 | 9/2020 | Benard | |

FOREIGN PATENT DOCUMENTS

| | | |
|---|---|---|
| GB | 2391059 | 1/2004 |
| WO | 2010103302 A1 | 9/2010 |

* cited by examiner

ATTACHABLE ACOUSTIC PANELS AND METHOD OF MAKING SAME

BACKGROUND

1. Technical Field

This disclosure relates generally to propulsion assemblies for aircraft, and more particularly to acoustic liners for propulsion assemblies.

2. Background Information

Acoustic attenuation panels are known for lining air flow surfaces of aircraft propulsion assemblies. Such acoustic structures are often referred to as acoustic liners. Generally, acoustic liners may include a cellular core covered on its exterior sides by a face skin and, on the opposite side, by a back skin. The face skin may include a plurality of spaced-apart holes or perforations. In this configuration, the cells of the core, covered by the face skin and the back skin, may form resonant cavities that contribute to the dissipation of incident acoustic energy by canceling acoustically reflected waves and/or converting acoustic energy into heat, such as by Helmholtz resonance. There is a need for improved acoustic panels which reduce manufacturing time and cost and improve acoustic panel resiliency while also effectively attenuating propulsion assembly noise.

SUMMARY

It should be understood that any or all of the features or embodiments described herein can be used or combined in any combination with each and every other feature or embodiment described herein unless expressly noted otherwise.

According to an aspect of the present disclosure, a propulsion assembly includes a fan configured to rotate about an axial centerline and a fan case system disposed about the fan with respect to the axial centerline. The fan case system includes at least one perforated portion including a plurality of holes extending from an interior surface of the fan case system to an exterior surface of the fan case system. The propulsion assembly further includes at least one acoustic panel mounted to the exterior surface of the fan case system coincident with the at least one perforated portion. The at least one acoustic panel includes a core including a plurality of cells extending between a first side of the core and a second side of the core opposite the first side of the core. The at least one acoustic panel further includes a back skin attached to the second side of the core. The first side of the core is in contact with the exterior surface of the fan case system to form a plurality of resonant cavities defined by the plurality of holes, the plurality of cells, and the back skin.

In any of the aspects or embodiments described above and herein, the fan case system includes a fan case portion surrounding the fan, an inlet portion mounted to the fan case portion and located at a forward end of the fan case system, and a fan duct portion mounted to the fan case portion and located at an aft end of the fan case system.

In any of the aspects or embodiments described above and herein, the at least one acoustic panel is mounted on the inlet portion.

In any of the aspects or embodiments described above and herein, the at least one acoustic panel is mounted on the fan duct portion.

In any of the aspects or embodiments described above and herein, the core and the back skin form a unitary component.

In any of the aspects or embodiments described above and herein, the propulsion assembly further includes a nacelle radially surrounding the fan case system. The at least one acoustic panel is located between the fan case system and the nacelle.

In any of the aspects or embodiments described above and herein, the at least one acoustic panel is curved in a circumferential direction relative to the axial centerline to correspond to a shape of the exterior surface of the fan case system.

In any of the aspects or embodiments described above and herein, the core includes a plurality of walls which define the plurality of cells, and each of the plurality of walls are substantially parallel to one another in a direction from the first side of the core to the second side of the core.

In any of the aspects or embodiments described above and herein, the plurality of holes has a hole density which changes in an axial direction.

In any of the aspects or embodiments described above and herein, the plurality of cells has a cell density which changes in an axial direction.

According to another aspect of the present disclosure, a method for forming a propulsion assembly includes forming a plurality of holes through a fan case system to define at least one perforated portion of the fan case system. The plurality of holes extends from an interior surface of the fan case system to an exterior surface of the fan case system. The method further includes forming at least one acoustic panel including a core including a plurality of cells extending between a first side of the core and a second side of the core opposite the first side of the core. The at least one acoustic panel further includes a back skin attached to the second side of the core. The method further includes mounting the at least one acoustic panel to the exterior surface of the fan case system coincident with the at least one perforated portion. The first side of the core is in contact with the exterior surface of the fan case system to form a plurality of resonant cavities defined by the plurality of holes, the plurality of cells, and the back skin.

In any of the aspects or embodiments described above and herein, the step of forming the at least one acoustic panel includes forming the core and the back skin as a unitary component.

In any of the aspects or embodiments described above and herein, the step of forming the at least one acoustic panel includes injection molding the at least one acoustic panel.

In any of the aspects or embodiments described above and herein, the at least one acoustic panel is curved in a circumferential direction relative to the axial centerline to correspond to a shape of the exterior surface of the fan case system.

In any of the aspects or embodiments described above and herein, the core includes a plurality of walls which define the plurality of cells, and each of the plurality of walls are substantially parallel to one another in a direction from the first side of the core to the second side of the core.

In any of the aspects or embodiments described above and herein, the step of forming the plurality of holes includes forming the plurality of holes with a hole density that changes in an axial direction.

In any of the aspects or embodiments described above and herein, the step of forming the at least one acoustic panel includes forming the plurality of cells with a cell density that changes in an axial direction.

In any of the aspects or embodiments described above and herein, the step of forming the at least one acoustic panel includes forming the at least one acoustic panel from a composite material.

According to another aspect of the present disclosure, an electric propulsion assembly for an aircraft includes a fan configured to rotate about an axial centerline and a fan case system disposed about the fan with respect to the axial centerline. The fan case system includes a plurality of perforated portions each including a plurality of holes extending from an interior surface of the fan case system to an exterior surface of the fan case system. The fan case system includes a fan case portion surrounding the fan, an inlet portion mounted to the fan case portion and located at a forward end of the fan case system, and a fan duct portion mounted to the fan case portion and located at an aft end of the fan case system. The electric propulsion assembly further includes a plurality of acoustic panels mounted to the exterior surface of the fan case system. Each acoustic panel of the plurality of acoustic panels is mounted to the fan case system coincident with a respective one of the plurality of perforated portions. Each acoustic panel includes a core including a plurality of cells extending between a first side of the core and a second side of the core opposite the first side of the core. Each acoustic panel further includes a back skin attached to the second side of the core. The first side of the core is in contact with the exterior surface of the fan case system to form a plurality of resonant cavities defined by the plurality of holes, the plurality of cells, and the back skin. The electric propulsion assembly further includes a nacelle disposed about the fan case system and the plurality of acoustic panels with respect to the axial centerline.

In any of the aspects or embodiments described above and herein, a first portion of the plurality of acoustic panels is mounted to the inlet portion and a second portion of the plurality of acoustic panels is mounted to the fan duct portion. Acoustic panels of the first portion are circumferentially spaced from one another about the inlet portion and acoustic panels of the second portion are circumferentially spaced from one another about the fan duct portion.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 1:
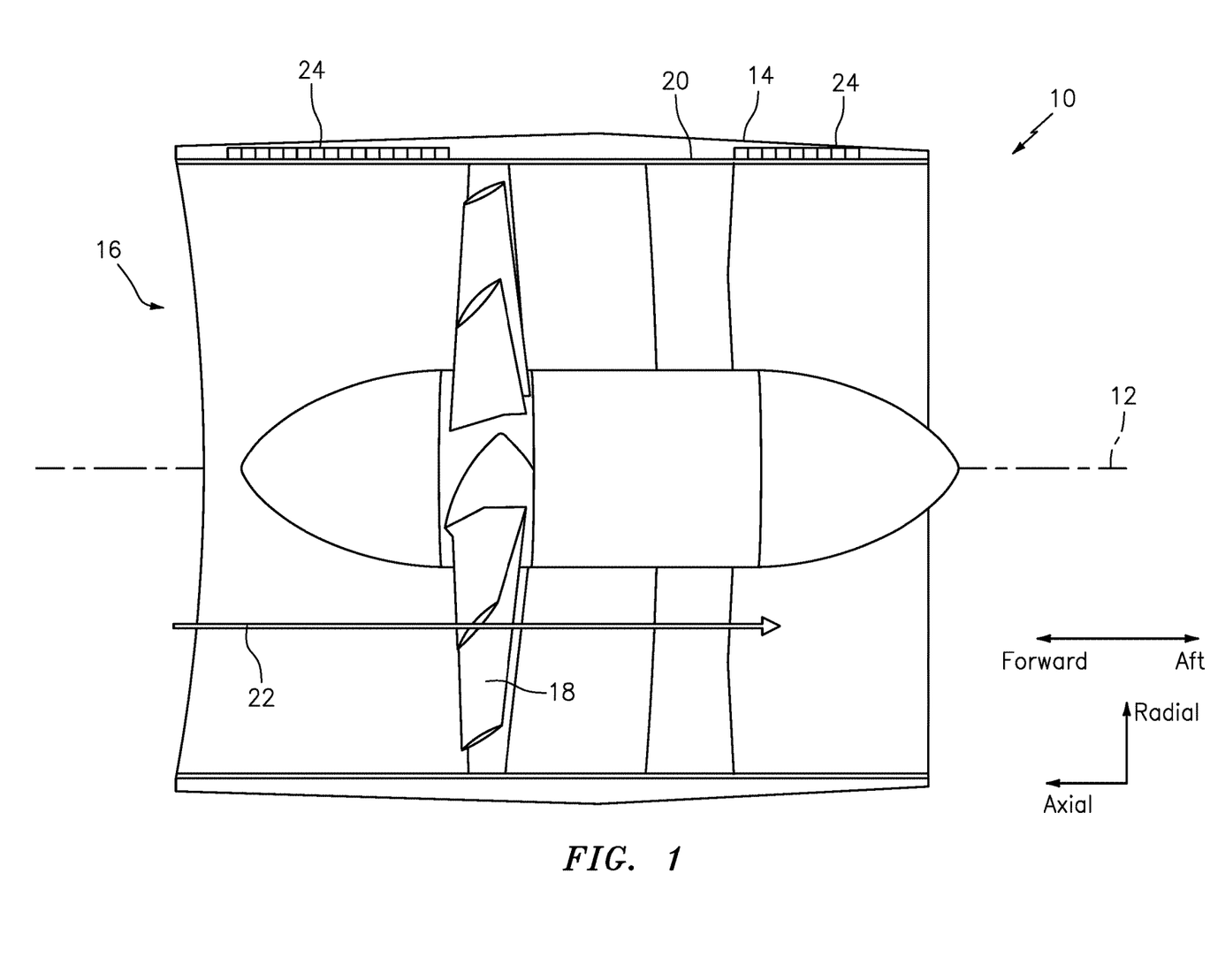
FIG. 1 illustrates a side, cross-sectional view of an exemplary propulsion assembly, in accordance with one or more embodiments of the present disclosure.
Figure 2:
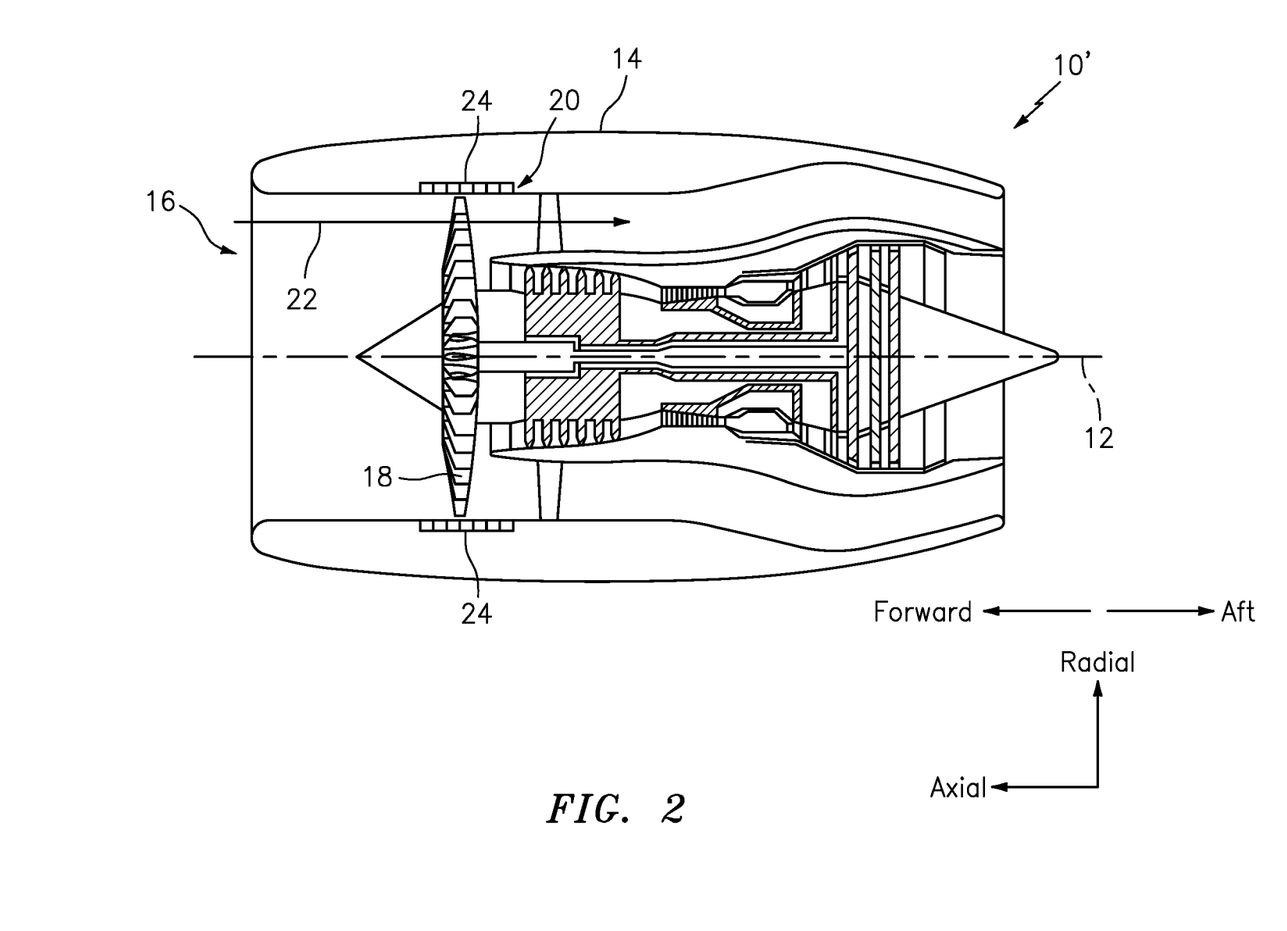
FIG. 2 illustrates a side, cross-sectional view of another exemplary propulsion assembly, in accordance with one or more embodiments of the present disclosure.

FIGS. 1 and 2 illustrate exemplary propulsion assemblies 10, 10' which may be included, for example, in an aircraft or other vehicle. The propulsion assembly 10 illustrated in FIG. 1 is an electric propulsion assembly (e.g., having a fan operated by an electric motor) while the propulsion assembly 10' of FIG. 2 is a gas turbine engine. The propulsion assembly 10, 10' is centered about an axial centerline 12 and housed by a nacelle 14 which forms an outer perimeter of the propulsion assembly 10, 10'. The propulsion assembly 10, 10' includes an inlet 16 and a fan 18 disposed downstream of the inlet 16 and configured to rotate about the axial centerline 12. The propulsion assembly 10, 10' further includes a fan case system 20 disposed about the fan 18 with respect to the axial centerline 12 and located within the nacelle 14 (e.g., the fan case system 20 is radially surrounded by the nacelle 14). The fan case system 20 defines an air flowpath 22 through at least a portion of the propulsion assembly 10, 10'. As will be discussed in further detail, the fan case system 20 includes at least one acoustic panel 24 configured to attenuate noise generated during operation of the propulsion assembly 10, 10'. While aspects of the present disclosure will be discussed with respect to the propulsion assembly 10 of FIG. 1, it should be understood that various aspects of the present disclosure will also be applicable to gas turbine engines, such as the propulsion assembly 10' of FIG. 2, as well as other configurations of rotational equipment such as industrial gas turbine engines, wind turbines, etc.

Referring to FIGS. 1 and 3-6, the acoustic panel 24 includes a core 26 having a plurality of cells 28 extending between a first side 30 of the core 26 and a second side 32 of the core 26, opposite the first side 30 of the core 26. The acoustic panel 24 further includes an imperforate back skin 34 attached to the second side 32 of the core 26. The plurality of cells 28 are defined by a corresponding plurality of walls 36 of the core 26 which extend from the first side 30 of the core 26 to the second side 32 of the core 26. In various embodiments, each cell of the plurality of cells 28 may be configured to form a "honeycomb" structure defined by, for example, six adjacent walls of the plurality of walls 36 (see, e.g., FIG. 6). However, it should be understood that aspects of the present disclosure may be applied to cells having alternative configurations as well, such as cells having a square cross-sectional configuration (see, e.g., FIGS. 3-5) or any other suitable configuration. As will be discussed in further detail, in various embodiments the core 26 and the back skin 34 of the acoustic panel 24 may form a unitary component. The term "unitary component" as used herein with respect to the acoustic panel 24 means a single component, wherein the core 26 and the back skin 34 of the acoustic panel 24 are an inseparable body (e.g., formed of a single material).

The fan case system 20 may include one or more portions such as a fan case portion 38 which surrounds the fan 18, an inlet portion 40 mounted to the fan case portion 38 and located at a forward end of the fan case system 20 (e.g., upstream of the fan 18 with respect to the air flowpath 22), and a fan duct portion 42 mounted to the fan case portion 38 and located at an aft end of the fan case system 20 (e.g., downstream of the fan 18 with respect to the air flowpath 22). The fan case system 20 includes an exterior surface 44 which faces radially outward toward the nacelle 14 and an interior surface 46, opposite the exterior surface 44, which faces radially inward and defines the air flowpath 22 through the propulsion assembly 10. In various embodiments, the fan case portion 38 and the inlet portion 40, the fan case portion 38 and the fan duct portion 42, or all of the fan case portion 38, the inlet portion 40, and the fan duct portion 42 may form a unitary component. The term "unitary component" as used herein with respect to the fan case system 20 means a single component, wherein two or more of the portions 38, 40, 42 of the fan case system 20 are an inseparable body (e.g., formed of a single material).

The fan case system 20 includes at least one perforated portion 48 including a plurality of holes 50 extending through the fan case system 20 from the exterior surface 44 to the interior surface 46. The fan case system 20 may include a plurality of perforated portions 48 which may be located on one or more of the fan case portion 38, the inlet portion 40, and the fan duct portion 42. As will be discussed in further detail, the perforated portion 48 may have a shape on the fan case system 20 which corresponds to a shape of a respective acoustic panel 24.

Figure 3:
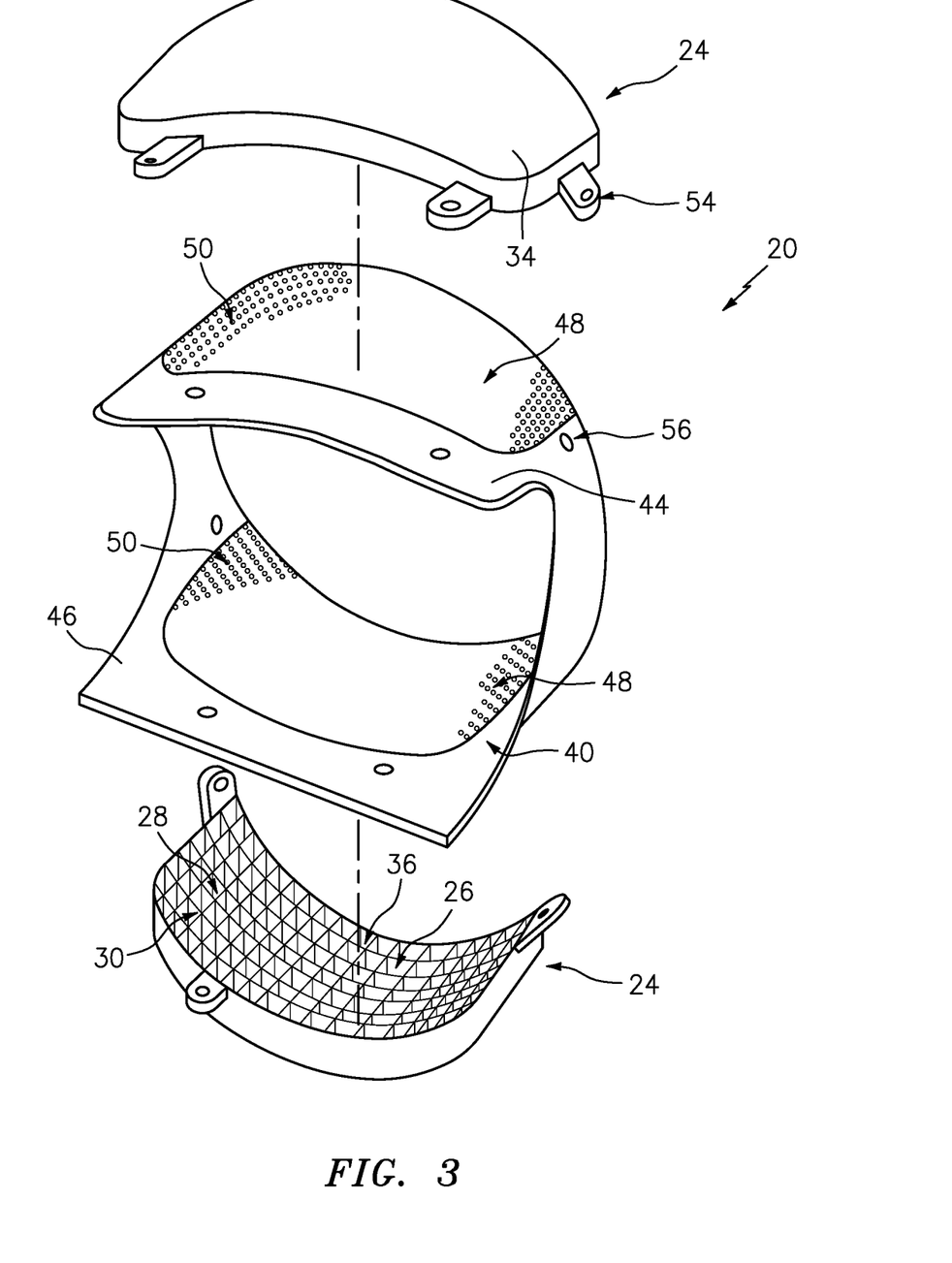
FIG. 3 illustrates a perspective, exploded view of a portion of a fan case system of the propulsion assembly of FIG. 1, in accordance with one or more embodiments of the present disclosure.
Figure 4:
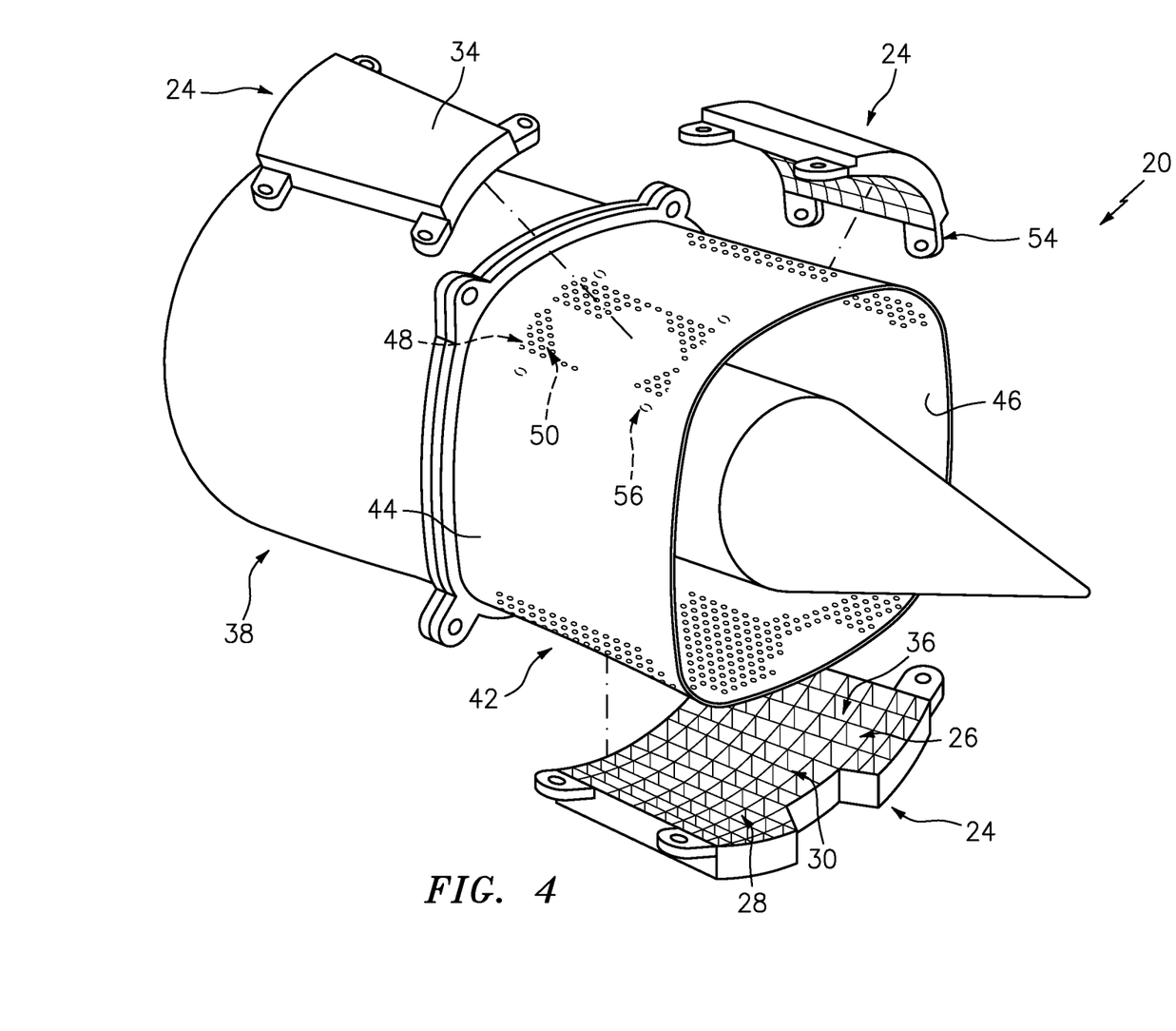
FIG. 4 illustrates a perspective, exploded view of a portion of a fan case system of the propulsion assembly of FIG. 1, in accordance with one or more embodiments of the present disclosure.
Figure 5:
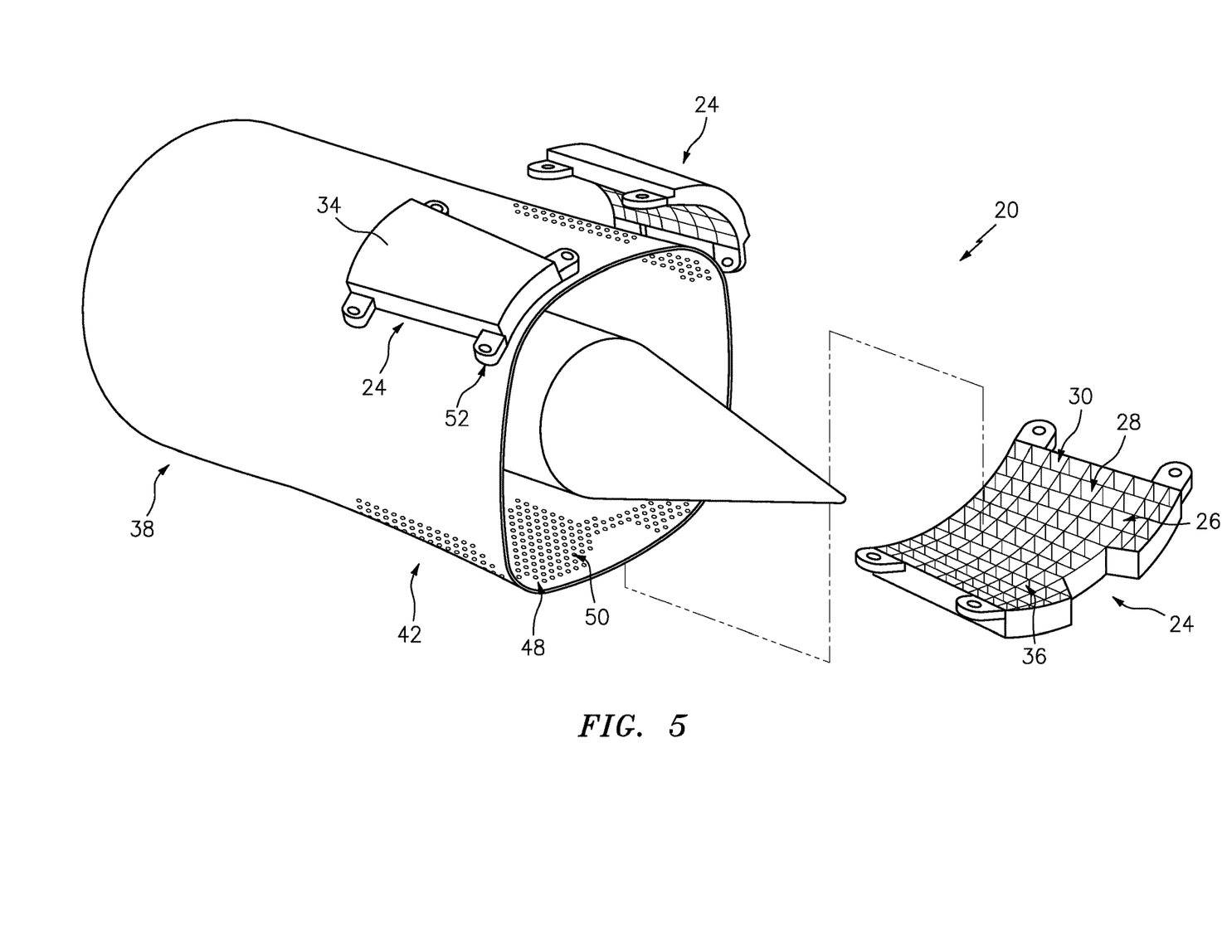
FIG. 5 illustrates a perspective, exploded view of a portion of a fan case system of the propulsion assembly of FIG. 1, in accordance with one or more embodiments of the present disclosure.
Figure 6:
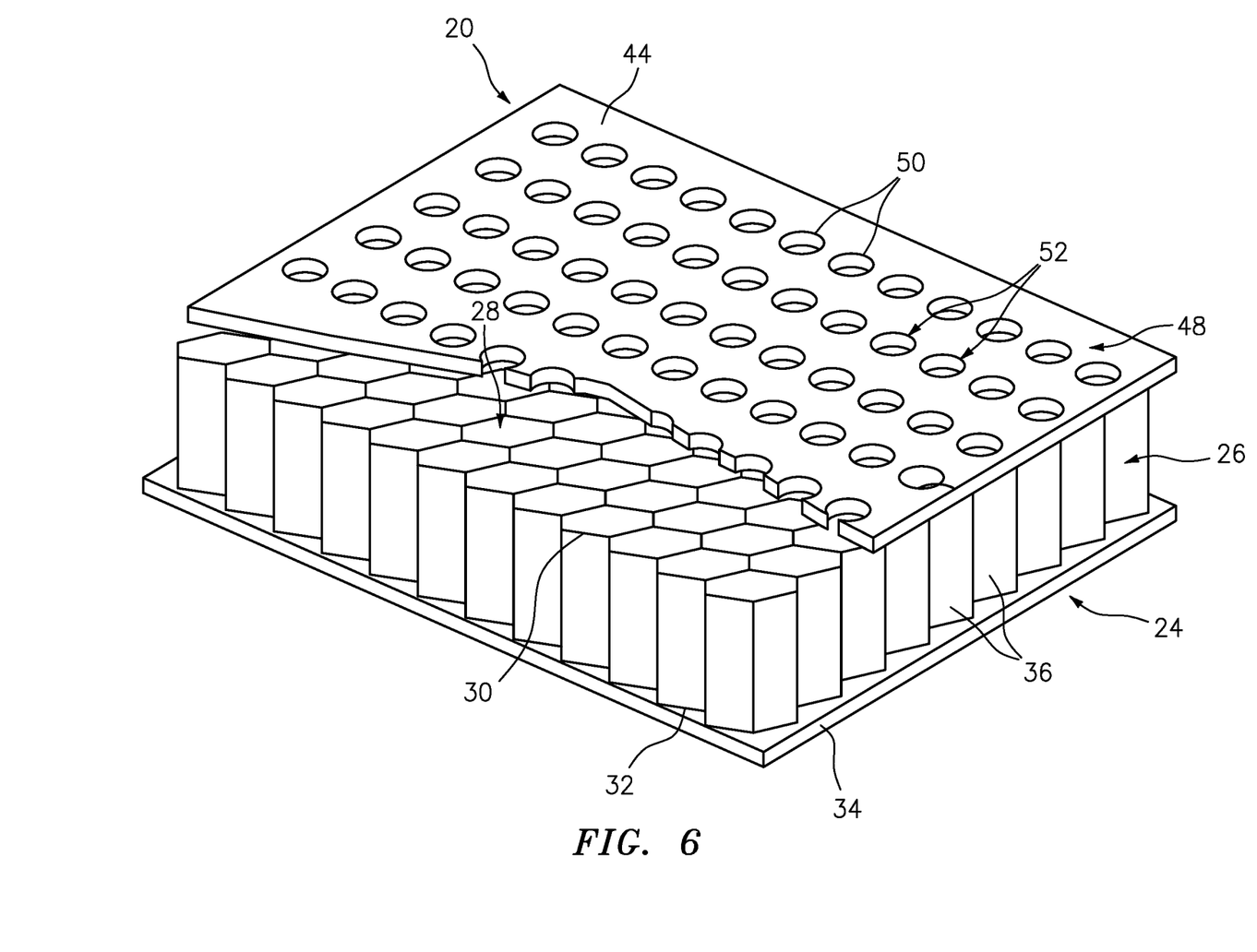
FIG. 6 illustrates a perspective, cut-away view of a portion of an acoustic panel of the fan case system, in accordance with one or more embodiments of the present disclosure.

As illustrated, for example, in FIGS. 3-5, the at least one acoustic panel 24 may be mounted to the exterior surface 42 of the fan case system 20 coincident with (e.g., at the location of) a respective perforated portion 48 such that the acoustic panel 24 covers all or substantially all of the plurality of holes 50 of the perforated portion 48. The first side 30 of the core 26 may be mounted to the exterior surface 42 of the fan case system 20 to form a plurality of resonant cavities 52 defined by the plurality of holes 50, the plurality of cells 28, and the back skin 34. Accordingly, the perforated portion 48 of the fan case system 20 may operate as a face skin for the acoustic panel 24, thereby allowing the acoustic panel 24 to be mounted radially outside the fan case system 20 while still attenuating noise internal to the fan case system 20. In various embodiments, one or a plurality of holes may be in communication with each cell of the plurality of cells 28 and the number of holes in communication with each cell of the plurality of cells 28 may be different than the number of holes in communication with other cells of the plurality of cells 28. For example, the holes of the plurality of holes 50 may not be in alignment with particular cells of the plurality of cells 28. In general, the density of holes of the plurality of holes 50 in an area of the fan case system 20 may be greater than the density of cells of a respective plurality of cells 28, however, the present disclosure is not limited to such a configuration.

Acoustic panels 24 may be mounted to the fan case portion 38, the inlet portion 40, and/or the fan duct portion 42 of the fan case system 20. Multiple acoustic panels 24 may be mounted to a particular portion 38, 40, 42 of the fan case system 20. For example, a series of acoustic panels 24 may be circumferentially spaced from one another about one or more of the portions 38, 40, 42 of the fan case system 20. Circumferential spacing between acoustic panels 24 may be uniform (see, e.g., FIG. 3) or non-uniform (see, e.g., FIGS. 4 and 5). The acoustic panels 24 mounted to a portion 38, 40, 42 of the fan case system 20 may have substantially identical shapes with respect to one another or may have differing shapes. For example, a first acoustic panel 24 mounted to a particular portion 38, 40, 42 of the fan case system 20 may have a first shape while a second acoustic panel 24 mounted to the particular portion 38, 40, 42 of the fan case system 20 may have a second shape, which is different than the first shape. In various embodiments, radial spacing between the fan case system 20 and the nacelle 14 may be limited and, therefore, may not provide sufficient space to accommodate the acoustic panel 24 along some portions of the fan case system 20. For example, radial spacing between the fan case system 20 and the nacelle 14 may vary in one or both of an axial direction or a circumferential direction. Accordingly, the shapes and locations of acoustic panels 24 may correspond to portions of the fan case system 20 where sufficient radial space is available between the fan case system 20 and the surrounding nacelle 14.

In various embodiments, the acoustic panel 24 may be mounted to the fan case system 20 with one or more fasteners (not shown) extending through respective fastener holes 54, 56 in the acoustic panel 24 and the fan case system 20. In various embodiments, the fasteners may be formed on (e.g., integral with) the fan case system 20 such that the fasteners project radially outward from the exterior surface 44 of the fan case system 20. Incorporation of the fasteners into the fan case system 20 may provide for simplified assembly while also reducing the risk of foreign object damage (FOD) to the propulsion assembly 10 by the fasteners. In various embodiments, the acoustic panels 24 may be bonded, welded, or otherwise attached to the exterior surface 44 of the fan case system 20. The present disclosure is not limited to any particular method for attaching the acoustic panel 24 to the fan case system 20.

The plurality of resonant cavities 52 (e.g., Helmholtz resonant cavities) defined by the acoustic liner 24 and the perforated portion 48 of the fan case system 20 contribute to the dissipation of incident acoustic energy by attenuating acoustic reflected waves and/or converting acoustic energy into heat energy, such as by Helmholtz resonance. In operation, for example, an air stream (e.g., air flowing along the air flowpath 22) flows across the perforated portion 48 in a shearing direction. Air and/or noise from this air stream generally enters each cell of the plurality of cells 28 via the plurality of holes 50 extending through the perforated portion 48 of the fan case system 20, where the acoustic wave bounces back and forth within the respective resonant cavity.

In various embodiments, the acoustic panel 24 may be curved in one or more directions to correspond to a shape of the exterior surface 44 of the fan case system 20. For example, the acoustic panel 24 may be curved in a circumferential direction relative to the axial centerline 12. Additionally, or alternatively, the acoustic panel 24 may be curved in an axial direction relative to the axial centerline. While the acoustic panel 24 may be curved in one or more directions, each of the plurality of walls 36 which define the core 26 may be substantially parallel to one another in a direction from the first side 30 of the core 26 to the second side 32 of the core 26. Accordingly, each of the plurality of cells 28 may also be substantially parallel to one another through the core 26. In various embodiments, the plurality of holes 50 of the perforated portion 48 may extend substantially radially through the fan case system 20. In this case, one or more holes of the plurality of holes 50 may extend in a direction (e.g., along a hole centerline) through the fan case system 20 that is skewed (i.e., not parallel) relative to the orientation of the plurality of walls 36. In various other embodiments, each of the plurality of holes 50 may extend through the fan case system 20 in a direction that is substantially parallel to the direction of the plurality of walls 36 from the first side 30 of the core 26 to the second side 32 of the core 26. As used herein, the term "substantially" with regard to an angular relationship refers to the noted angular relationship (e.g., "parallel")+/−5 degrees.

Figure 7:
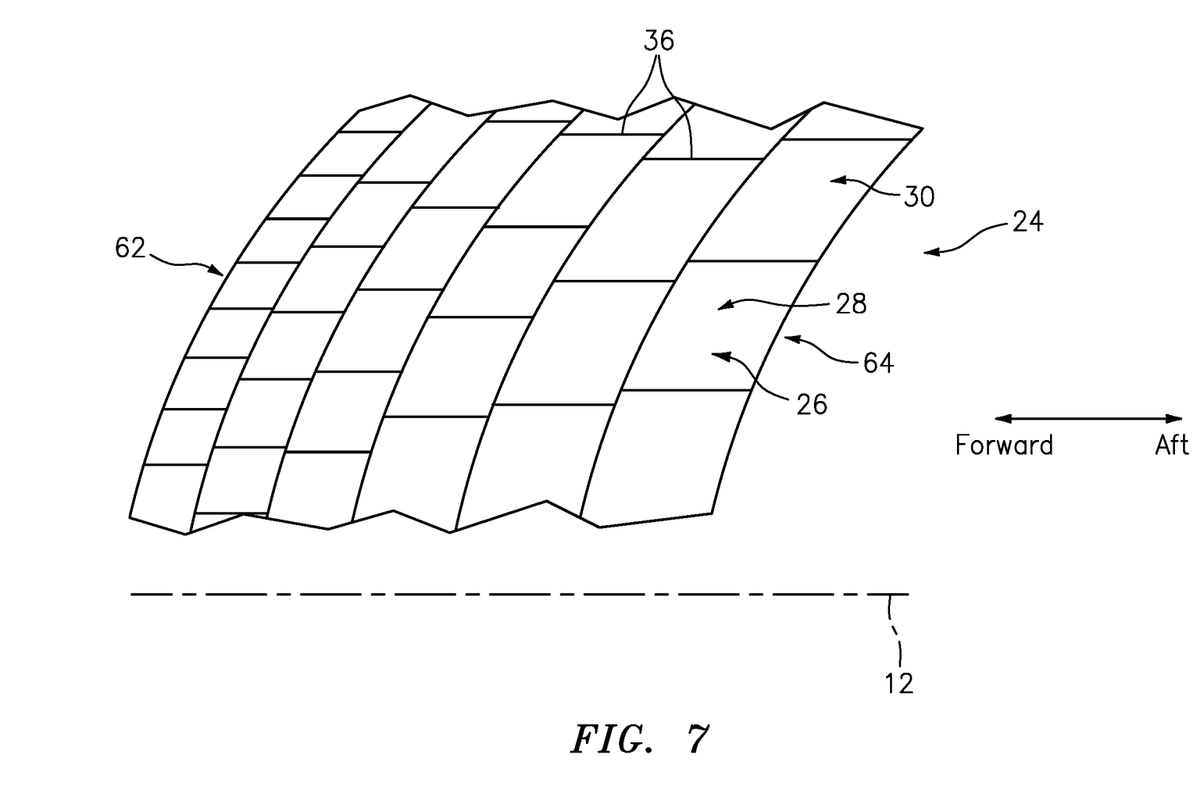
FIG. 7 illustrates a side, cross-sectional view of a portion of an acoustic panel of the fan case system, in accordance with one or more embodiments of the present disclosure.
Figure 8:
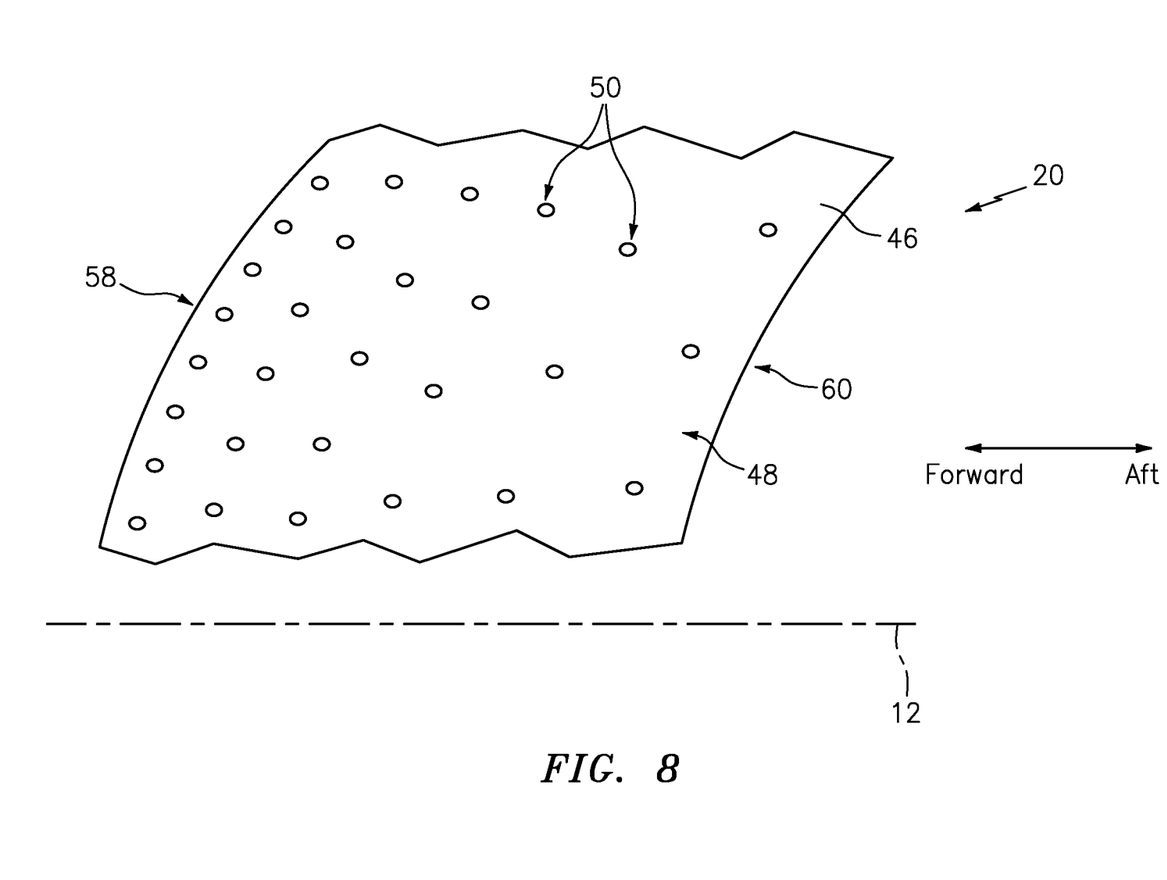
FIG. 8 illustrates a side, cross-sectional view of a portion of an acoustic panel of the fan case system, in accordance with one or more embodiments of the present disclosure.
Figure 9:
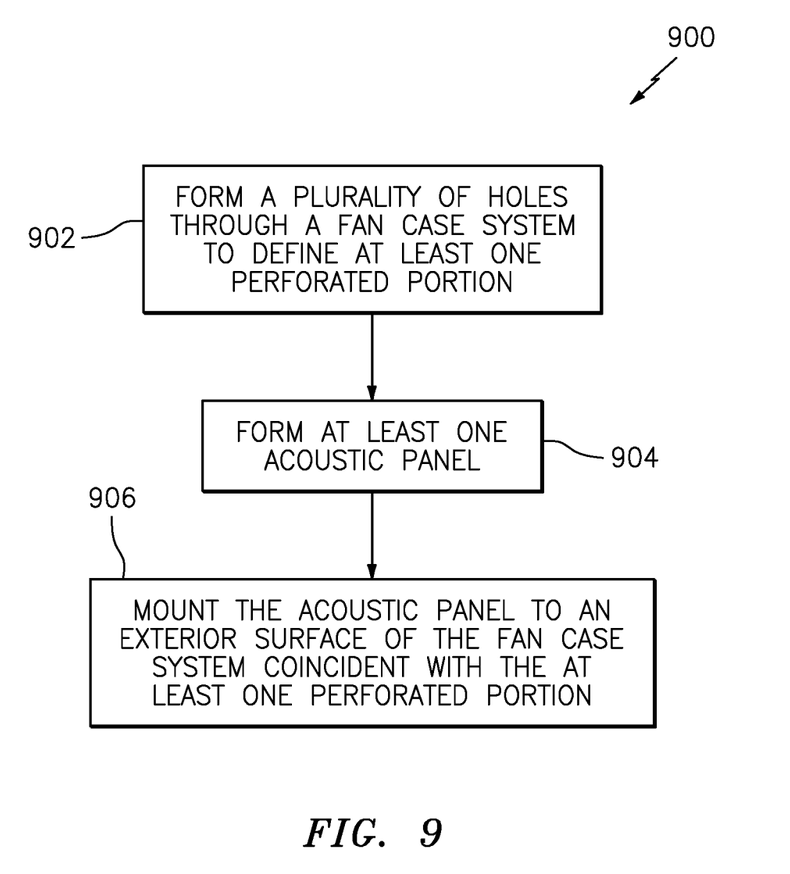
FIG. 9 illustrates a flowchart for a method for forming a propulsion assembly, in accordance with one or more embodiments of the present disclosure.

Referring to FIGS. 7 and 8, in various embodiments, the plurality of holes 50 of the perforated portion 48 may have a hole density which changes in one or more directions, such as an axial direction and/or a circumferential direction. For example, the plurality of holes 50 may have a hole density which decreases from a higher first hole density 58 to a lower second hole density 60 in an axial direction (e.g., in an axial direction from forward to aft), or vice versa. As used herein, the term "hole density" refers to the number of holes of the plurality of holes 50 per unit area of the fan case system 20. The size and hole density of the plurality of holes 50 may be selected to achieve a particular porosity (e.g., a ratio of the hole volume to the fan case system 20 material volume in the perforated portion 48) which, like the hole density, may change in one or more directions, such as an axial direction and/or a circumferential direction. Alternatively, or additionally, in various embodiments, the plurality of cells 28 of the acoustic panel 24 may have a cell density which changes in one or more directions, such as an axial direction and/or a circumferential direction. To accommodate different cell densities, the cross-sectional sizes of the plurality of cells 28 may vary in the one or more directions. For example, the plurality of cells 28 may have a cell density which decreases from a higher first cell density 62 to a lower second cell density 64 in an axial direction (e.g., in an axial direction from forward to aft), or vice versa. As used herein, the term "cell density" refers to the number of cells of the plurality of cells 28 configured to be in contact with the fan case system 20 per unit area of the fan case system 20. In various embodiments, the relative hole densities and cell densities may vary similarly or differently in the one or more directions. Variation of the hole density of the perforated portion 48 and/or the cell density of the acoustic panel 24 allow the acoustic attenuation of the acoustic panels 24 to be tailored to address particular acoustic frequencies or varying levels of noise to be attenuated at varying circumferential and/or axial portions of the propulsion assembly 10.

The acoustic panel 24 may be made from any material suitable for the attenuation of acoustic energy within a respective assembly, such as the propulsion assemblies 10, 10', and the present disclosure is not limited to any particular material. The acoustic panel 24 material may be a lightweight and/or inexpensive material that can be rapidly processed to produce the acoustic panel 24. For example, the acoustic panel 24 may be made from metal (e.g., aluminum, titanium, etc.) composite materials such as reinforced plastics (e.g., fiber reinforced plastics), plastic polymers (e.g., thermoplastics or thermosets), etc. Acoustic panels 24 for use in the propulsion assembly 10' may require a greater resilience to high temperatures than that which would be required for acoustic panels 24 for use in the propulsion assembly 10.

Referring to FIGS. 3-6 and 9, a Method 900 for forming a propulsion assembly includes in Step 902, forming the plurality of holes 50 through the fan case system 20 to define at least one perforated portion 48 of the fan case system 20. The plurality of holes 50 may be formed by one or more lasers, drilling assemblies, or any other suitable method and the present disclosure is not limited to any particular method for forming the plurality of holes 50. In Step 904, the at least one acoustic panel 24 is formed. The at least one acoustic panel 24 may be formed as a unitary component by a process such as injection molding. Alternatively, the core 26 and the back skin 34 of the acoustic panel 24 may be formed separately and attached to one another. The present disclosure is not limited to any particular method for forming the acoustic panel 24. In Step 906, the acoustic panel 24 is mounted to the exterior surface 44 of the fan case system 20 coincident with the respective perforated portion 48 to form the plurality of resonant cavities 52 defined by the plurality of holes 50, the plurality of cells 28, and the back skin 34.

To provide optimal flow characteristics within a propulsion assembly, the interior surfaces of the propulsion assembly may be configured to minimize resistance to air flow therethrough. For conventional propulsion assemblies with acoustic panels mounted internal to the fan case system, the fan case system must be shaped to accommodate the acoustic panels and to minimize transitions between flow surfaces of the acoustic panels and flow surfaces of adjacent portions of the fan case system which are not covered by the acoustic panels. This configuration of conventional propulsion assemblies may increase the complexity of manufacturing as well as prevent subsequent modification of acoustic panel configurations (e.g., size, shape, orientation, and quantity of acoustic panels). Aspects of the present disclosure may simplify fan case system design and manufacturing while providing flexibility to modify acoustic panel configurations for existing fan case systems. Further, mounting of the acoustic panel 24 to the exterior surface 44 of the fan case system 20, instead of an interior surface 46, reduces or eliminates the potential for FOD damage to the acoustic panels 24 or FOD damage to downstream portions of the propulsion assembly 10, 10' which may be caused by one or more components of an internally mounted acoustic panel which break loose during operation.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A propulsion assembly comprising
a fan configured to rotate about an axial centerline;
a fan case system disposed about the fan with respect to the axial centerline, the fan case system comprising a plurality of perforated portions each comprising a plurality of holes extending from an interior surface of the fan case system to an exterior surface of the fan case system; and
a plurality of acoustic panels mounted to the exterior surface of the fan case system, each acoustic panel of the plurality of acoustic panels mounted to the fan case system coincident with a respective one of the plurality of perforated portions, each acoustic panel comprising a core comprising a plurality of cells extending between a first side of the core and a second side of the core opposite the first side of the core, each acoustic panel further comprising a back skin attached to the second side of the core, the first side of the core in contact with the exterior surface of the fan case system to form a plurality of resonant cavities defined by the plurality of holes, the plurality of cells, and the back skin.

2. The propulsion assembly of claim 1, wherein the fan case system comprises a fan case portion surrounding the fan, an inlet portion mounted to the fan case portion and located at a forward end of the fan case system, and a fan duct portion mounted to the fan case portion and located at an aft end of the fan case system.

3. The propulsion assembly of claim 2, wherein at least one of the plurality of acoustic panels is mounted on the inlet portion.

4. The propulsion assembly of claim 2, wherein at least one of the plurality of acoustic panels is mounted on the fan duct portion.

5. The propulsion assembly of claim 1, wherein the core and the back skin form a unitary component.

6. The propulsion assembly of claim 1, further comprising a nacelle radially surrounding the fan case system, the plurality of acoustic panels located between the fan case system and the nacelle.

7. The propulsion assembly of claim 1, wherein at least one of the plurality of acoustic panels is curved in a circumferential direction relative to the axial centerline to correspond to a shape of the exterior surface of the fan case system.

8. The propulsion assembly of claim 7, wherein the core comprises a plurality of walls which define the plurality of cells, and each of the plurality of walls are substantially parallel to one another in a direction from the first side of the core to the second side of the core.

9. The propulsion assembly of claim 1, wherein the plurality of holes has a hole density which changes in an axial direction.

10. The propulsion assembly of claim 1, wherein the plurality of cells has a cell density which changes in an axial direction.

11. A method for forming a propulsion assembly, the method comprising:
forming a plurality of holes through a fan case system to define a plurality of perforated portions of the fan case system, the plurality of holes extending from an interior surface of the fan case system to an exterior surface of the fan case system;
forming a plurality acoustic panels each comprising a core comprising a plurality of cells extending between a first side of the core and a second side of the core opposite the first side of the core, the plurality of acoustic panels further comprising a back skin attached to the second side of the core;
mounting each of the plurality of acoustic panels to the exterior surface of the fan case system with each acoustic panel of the plurality of acoustic panels mounted to the fan case system coincident with a respective one of the plurality of perforated portions, the first side of the core in contact with the exterior surface of the fan case system to form a plurality of resonant cavities defined by the plurality of holes, the plurality of cells, and the back skin.

12. The method of claim 11, wherein the step of forming the plurality of acoustic panels comprises forming the core and the back skin as a unitary component.

13. The method of claim 12, wherein the step of forming the plurality of acoustic panels comprises injection molding the plurality of acoustic panels.

14. The method of claim 13, wherein the at least one of the plurality of acoustic panels is curved in a circumferential direction relative to the axial centerline to correspond to a shape of the exterior surface of the fan case system.

15. The method of claim 14, wherein the core comprises a plurality of walls which define the plurality of cells, and each of the plurality of walls are substantially parallel to one another in a direction from the first side of the core to the second side of the core.

16. The method of claim 11, wherein the step of forming the plurality of holes comprises forming the plurality of holes with a hole density that changes in an axial direction.

17. The method of claim 11, wherein the step of forming the plurality of acoustic panels comprises forming the plurality of cells with a cell density that changes in an axial direction.

18. The method of claim 11, wherein the step of forming the plurality of acoustic panels comprises forming the plurality of acoustic panels from a composite material.

19. An electric propulsion assembly for an aircraft, the electric propulsion assembly comprising:
a fan configured to rotate about an axial centerline;
a fan case system disposed about the fan with respect to the axial centerline, the fan case system comprising a plurality of perforated portions each comprising a plurality of holes extending from an interior surface of the fan case system to an exterior surface of the fan case system, the fan case system comprising a fan case portion surrounding the fan, an inlet portion mounted to the fan case portion and located at a forward end of the fan case system, and a fan duct portion mounted to the fan case portion and located at an aft end of the fan case system;
a plurality of acoustic panels mounted to the exterior surface of the fan case system, each acoustic panel of the plurality of acoustic panels mounted to the fan case system coincident with a respective one of the plurality of perforated portions, each acoustic panel comprising a core comprising a plurality of cells extending between a first side of the core and a second side of the core opposite the first side of the core, each acoustic panel further comprising a back skin attached to the second side of the core, the first side of the core in contact with the exterior surface of the fan case system to form a plurality of resonant cavities defined by the plurality of holes, the plurality of cells, and the back skin; and a nacelle disposed about the fan case system and the plurality of acoustic panels with respect to the axial centerline.

20. The electric propulsion assembly of claim 19, wherein a first portion of the plurality of acoustic panels is mounted to the inlet portion and a second portion of the plurality of acoustic panels is mounted to the fan duct portion, wherein acoustic panels of the first portion are circumferentially spaced from one another about the inlet portion and acoustic panels of the second portion are circumferentially spaced from one another about the fan duct portion.

* * * * *